United States Patent [19]

Papirer et al.

[11] 4,082,660

[45] Apr. 4, 1978

[54] METHOD OF PURIFICATION

[75] Inventors: Eugéne Papirer, Pfastatt; Jean-Baptiste Donnet, Didenheim, both of France

[73] Assignee: Agence Nationale de Valorisation de la Recherche, Neuilly-sur-Seine, France

[21] Appl. No.: 661,347

[22] Filed: Feb. 25, 1976

Related U.S. Application Data

[63] Continuation of Ser. No. 579,210, May 20, 1975, abandoned, which is a continuation of Ser. No. 412,126, Nov. 2, 1973, abandoned.

[30] Foreign Application Priority Data

Nov. 3, 1972 France .................................. 72.38973

[51] Int. Cl.$^2$ ................................................ C02B 9/02
[52] U.S. Cl. ........................................ 210/36; 210/40; 210/DIG. 26

[58] Field of Search ........... 210/36, 40, 504, DIG. 26, 210/502

[56] References Cited

U.S. PATENT DOCUMENTS

| | | | |
|---|---|---|---|
| 2,367,384 | 1/1945 | Tymstra et al. | 210/36 |
| 3,537,587 | 11/1970 | Kain | 210/DIG. 26 |
| 3,591,494 | 7/1971 | Crouch et al. | 210/40 |
| 3,704,786 | 12/1972 | Lerner et al. | 210/504 |

*Primary Examiner*—Charles N. Hart
*Assistant Examiner*—Ivars Cintins
*Attorney, Agent, or Firm*—Larson, Taylor and Hinds

[57] ABSTRACT

The purification agent is constituted by a pulverulent mineral solid, on the surface of the constituent particles of which chains of polymers are fixed by grafting. The agent is useful for the purification of waters polluted for example by organic impurities such as hydrocarbons, and may be applied to the cleaning of systems which have contained petroleum.

7 Claims, No Drawings

METHOD OF PURIFICATION

This is a continuation, of application Ser. No. 579,210 filed May 20, 1975, which is a continuation of application Ser. No. 412,126 filed Nov. 2, 1973; both now abandoned.

The invention relates to a method of purification of the type which enables the purification of waters polluted by impurities for example organic such as particularly hydrocarbons.

It has already been suggested to have recourse, to free waters from hydrocarbons which pollute them, to polymers taking advantage of the swelling of these polymers under the influence of solvents such as hydrocarbons.

However, purification agents based on such polymers present for example the following drawbacks:
  difficulties in the removal of the polymer which has fixed the impurities, as a result of the formation of gels;
  slowness of the process of fixation.

It is a particular object of the invention to provide a process employing a purification agent of the type concerned, which responds better to the various desiderata of practice than those existing hitherto, which is insoluble in aqueous media and easily recoverable.

The purification agent employed in the invention is constituted by a pulverulent solid on the surface of the constituent particles of which chains of polymers are fixed by grafting.

This grafting of the polymer chains on the pulverulent mineral solid distinguishes the purification agent according to the invention from the products which would be constituted by particles simply coated with polymer.

In fact, the grafting ensures a particularly strong bond between the mineral and the polymer.

Through this fact, the drawbacks which would arise, in coated products, of partial dissolution of the coating material, introducing impurities into the water and reducing the floatability of the product, are avoided.

In the purification agent employed in the invention, the proportion of grafting is advantageously comprised between 3 and 90%, it being understood here as in the rest of the description, that this proportion of grafting, or proportion of fixation, denotes the percentage by weight of polymer grafted on the pulverulent mineral with respect to the weight of this mineral.

The purification method according to the invention is characterized by the fact that the water to be purified is treated with an effective amount of the purification agent according to the invention.

In a preferred embodiment, the purification agents according to the invention are constituted by pulverulent solids selected from the group formed by silica, the oxides of zinc, of titanium, of aluminum, as well as silicates, silicoaluminates and metallic carbonates, the constituent particles of said pulverulent solids comprising on their surface chains of polymers fixed by grafting.

The polymers grafted to the surface of the constituent particles of the purification agent may be selected from the group of those which comprise double bonds, carbonyl groups or peroxide groups, for example among the macromolecular paraffins and their derivatives, the polyvinyl derivatives and the polydienes, the polyolefines and the polystyrenes and, preferably, among the copolymers of butadienestyrene, polyethylenes and polyisoprenes.

To manufacture the purification agents of the type concerned, recourse may be had to various methods such as grafting by the ionic route, by the radical route or again such as grafting under irradiation and, in particular, that which is the subject of French patent application No. 71.27329 filed by applicant July 26, 1971 and according to which polymer chains are fixed by grafting to the surface of a pulverulent solid comprising electron donor ionic sites by reacting, in the midst of a solvent and in the presence of said pulverulent solid, an electrophilic compound on the selected polymer, the electrophilic compound concerned being of the type of those which comprise aluminum chloride, boron trifluoride and zinc chloride, this reaction providing carbocations which are fixed on the constituent particles of the pulverulent solid.

The purification agents thus constituted are completely insoluble in aqueous media and very effective by reason of the large contact surface that they offer to the hydrocarbons which have to be extracted from the polluted aqueous media.

The possibility of selecting the nature of the polymer grafted to the surface of the constituent particles of the pulverulent solid enables the properties of a purification agent according to the invention to be adapted to the nature of the hydrocarbon impurities which have to be removed; the polymer is selected from among those which are insoluble in the hydrocarbon to be removed.

The insolubility of the purification agents which have already been mentioned above enables them to be very easily recovered once the aqueous medium treated has been purified.

The fact is emphasized that the polymer fixed to the surface of the constituent particles of the pulverulent solid is not cross-linked, increases the absorption capacity of the thus constituted purification agent.

As regards the application of the method according to the invention, it is possible either to disperse the purification agent in the water to be purified, or to house it in a cartridge which said water is caused to traverse.

As regards the amount of purification agents applied within the scope of the method according to the invention, it is indicated, to establish ideas that, in the case of silica grafted to a proportion of 30%, it is convenient to use thereof something of the order of 1 g to absorb 3 to 5 g of hydrocarbon.

To manufacture the purification agent according to the invention, the operation is carried out in the midst of a solvent selected from among those which are capable of dissolving the polymer which it is desired to form as a graft of the constituent chains on the particles of the pulverulent solid.

In practice, the polymer may firstly be dissolved, then the pulverulent solids dispersed in the solution thus formed and the electrophilic compound added. It is also possible to add first the electrophilic compound to the solution of the polymer and then to disperse the pulverulent solid. The first method is generally preferred by reason of the fact that the carbocations have often a brief life-span and that it is consequently advantageous for the pulverulent solid to be present at the moment of their appearance.

The temperature of the reaction is selected so that the best kinetic conditions possible are obtained. Its upward limit is determined by the boiling point of the solvent.

The amount of electrophilic compound present in the reaction medium must be selected such that there appear a sufficient number of carbocations. In practice, there is generally used an amount of electrophilic compound corresponding to at least 10% of the total amount of pulverulent solid and of polymer. Higher amounts may however be used on condition that the velocity, then increased, of the reaction does not constitute a drawback.

The respective proportions of the pulverulent solid and of the polymer are variable. The ratio of the fixing of the polymer increases generally with the proportion of a polymer in the reaction mixture.

In pratice, the respective proportions concerned go from 90 to 10% of polymer and 10 to 90% of pulverulent solid in the reaction mixture constituted by the polymer and the pulverulent solid.

The duration of the reaction of fixing the carbocations to the surface of the constituent particles of the pulverulent solid, or grafting reaction, is variable. It is a function, among other things, of the amount of electrophilic compound present in the mixture.

The end of the reaction is manifested, from the macroscopic point of view, by the formation of a stable suspension, just as the appearance of the carbocations is manifested, macroscopically, by a characteristic coloration, visible in the case of white fillers, which appear when the electrophilic compound is placed in the presence of the polymer.

Once the grafting reaction is terminated, the purification agent formed by precipitation by means of a non-solvent of the polymer such as methanol and filtration is isolated, by direct filtration of the reaction medium, by extraction by means of solvents or by centrifugation, the latter method giving the best results but requiring complex equipment.

In practice, the choice of one or the other of the separating methods which have just been indicated is guided above all by the granulometry of the pulverulent solid.

After this separation, the unfixed polymer is extracted from the purification agent formed by means of a solvent for said polymer.

After evaporation of the solvent, carried out whilst respecting the precautions which enable any change in the grafted polymer to be avoided, the desired pulverulent purification agent is left.

To illustrate this method of manufacture, some numerical examples are given below, which are not to be regarded as limiting.

EXAMPLE 1

Fixing of a butadiene-styrene copolymer on silica 20 g of butadiene-styrene rubber whose molecular weight is 300,000, is dissolved in 600 cm$^3$ of orthodichlorobenzene whose temperature is 140° C. In the solution thus obtained, 20 g of silica of the trademark "AEROSIL 130" of the DEGUSSA Company are dispersed, then with good stirring 1 g of AlCl$_3$ is added. A brown-violet coloration, due to the formation of the carbocations AlCl$_3$ polymer appears immediately. The reaction continues for an hour then the purification agent formed is recovered, either by precipitating, by means of methanol, the whole including the polymer which has not reacted and the purification agent formed, by separating the precipitate by filtration and extracting therefrom the polymer which has not reacted by means of toluene, or by separating the purification agent formed by filtering the reaction solution and extracting by means of toluene from the said solid residue the polymer which has not reacted.

The degree of fixation of the polymer on the silica is determined by removing the polymer by combustion at 750° C and by taking into account the resulting loss in weight.

The degree of fixation found is 48%.

The product obtained is entirely hydrophobic (it floats on the surface of water) and swells in good solvents for butadiene-styrene rubber (for example in toluene).

EXAMPLE 2

Fixation of polyethylene on silica 20 g of polyethylene whose molecular weight is 500,000 is dissolved in 600 cm$^3$ of orthodichlorobenzene whose temperature is 140° C. Into the solution thus obtained, is dispersed 20 g of silica of the mark "AEROSIL 130" then, with stirring 1 g of AlCl$_3$ is added. An orange-violet color appears. At the end of an hour of reaction, the purification agent thus formed is separated by filtration and the polymer which has not reacted is extracted with xylene. The proportion of fixation is 5 - 10%.

EXAMPLE 3

Fixation of polyisoprene on silica 20 g of polyisoprene whose molecular weight is 300,000 is dissolved in 600 cm$^3$ of toluene whose temperature is 140° C. In this solution, 40 g of silica of the mark "ZEOSIL Z 45" of the Company SIFRANCE is dispersed and, after homogenization, 2 g of AlCl$_3$ is added. A yellow-red coloration developing into brown appears. After an hour of reaction with stirring, the purification agent formed is separated by resorting to the method of extraction by solvent. After purification of the purification agent by means of toluene, the level of fixation is 8.8%.

EXAMPLE 4

Fixation of polyisoprene on carbon black

By preceding in the manner indicated in Example 3, with the slight difference that the "ZEOSIL Z 45" silica is replaced by an identical amount of carbon black with a specific surface of 125 m$^2$/g of the trademark "VULCAN 6" of the CABOT Company, there is obtained a purification agent whose degree of fixation is 5 - 7%.

Thus modified carbon black is completely hydrophilic and can no longer be dispersed in water even by employing ultrasonics.

EXAMPLE 5

Fixation os butadiene-styrene copolymer on carbon black

By preceding in the manner indicated in Example 1, with the slight difference that the silica is replaced by an identical amount of carbon black of the trademark "VULCAN 6," there is obtained a purification agent of which the fixation degree is 36%, which is entirely hydrophilic (dispersion no longer possible in water) and whose purification properties are good.

EXAMPLE 6

Fixation of polyisoprene on titanium oxide, zinc oxide and alumina

By proceding in the manner indicated in Example 3, with the slight difference that the silica is replaced by an identical amount of $TiO_2$ with a specific surface of 10 $m^2/g$ of ZnO and, lastly, of $Al_2O_3$ of specific surface 125 $m^2/g$, there are obtained purification agents whose degree of fixation are respectively 4.9%, 19.2% and 28.9%.

EXAMPLE 7

Fixation of butadiene-styrene copolymer on silica 20 g of butadiene-styrene rubber of molecular weight equal to 300,000 is dissolved in 600 $cm^3$ of orthodichlorobenzene whose temperature is 140° C. Into this solution, there is dispersed 20 g of silica of the trademark "AEROSIL 130" (DEGUSSA Company) whose specific surface is 130 $m^2/g$ then with stirring, 1 g of $BF_3$ is added. A brown-red coloration caused by the formation of the carbocations appears immediately. The reaction is allowed to continue for one hour, then the purification agents formed is recovered by precipitation with methanol and filtration. The unfixed polymer is separated by extraction by means of toluene, and then the degree of fixation is determined by combustion at 750° C taking into account the resulting loss in weight. The degree of fixation obtained is 75%. The purification agent thus prepared is fully hydrophobic; it floats on the surface of water and swells in solvents for butadiene-styrene rubber.

EXAMPLE 8

Fixation of polystyrene on "AEROSIL 200" silica 50 g of polystyrene of molecular weight 180,000 is dissolved at 80° C in 1 liter of orthodichlorobenzene. 30 g of "AEROSIL 200" silica is added and heating is continued, 2.5 g of $AlCl_3$ being added. Heating is continued for 30 minutes. The grafted silica is removed by filtration and purified by successive extractions by means of the same solvent. The degree of grafting is 15 to 20%.

EXAMPLE 9

Fixation of polyisoprene on asbestos 50 g of polyisoprene is dissolved in 1 liter of orthodichlorobenzene at 80° C and 150 g of natural asbestos of the chrysotile type is added and also 4.5 g of $AlCl_3$. Heating is continued for 30 minutes. The grafted support is separated by filtration and it is purified by successive extractions with orthodichlorobenzene. There is thus obtained a degree of fixation of 8%.

EXAMPLE 10

Grafting of butyl rubber on silica (ionic route)

A. 600 mg of "Aerosil 130" silica, whose specific surface is 130 $m^2/g$, are dispersed in a solution of 200 $cm^3$ of heptane containing 6 g of butyl rubber of molecular weight in the neighbourhood of 100,000. At ambient temperature, 2 $cm^3$ of a solution of aluminum trichloride is added (300 g/l) in nitrobenzene. It is allowed to react for 10 mn. After repeated washings of the silica with toluene, the degree of grafting is measured. 66% is found.

B. Under the same conditions as previously, but at 68° C, and after 15 minutes of treatment, the degree of grafting is 83%.

EXAMPLE 11

Grafting of butadiene rubber on silica

The grafting is ensured by the radical route, in the presence of lauroyl peroxide.

A. 5 g of polybutadiene are dissolved in 400 $cm^3$ of heptane. There is added thereto 3 g of "Aerosil 200" silica, of specific surface equal to 200 $m^2/g$. The mixture is heated at 78° C for 1 hour. The level of polybutadiene irreversably fixed on the silica is equal to 56%.

B. In another case 5 g of Spheron 6 (black manufactured by the Cabot Company), of specific surface equal to 125 $m^2/g$ are dispersed in a toluene solution of SBR, at the rate of 50 g/liter. There is added thereto 1 g of lauroyl peroxide and it is allowed to react for 4 hours at 80° C. After purification, the degree measured is 13.6%.

C. In another treatment, there was used bentonite (magnesium silicoaluminate) and SBR or styrene-butadiene rubber (25 g per 25 g of silica) dissolved in orthodichlorobenzene. 2 g of lauroyl peroxide is added and heated to 90° C. The degree of grafting is 11.5%.

EXAMPLE 12

Grafting of butadiene rubber on silica

Free radicals are generated here, by degradation with U.V. radiation.

5 g of SBR are dissolved in 1.5 l of cyclohexane. There is dispersed therein 50 g of "A 130" silica and the mixture is illuminated for 7 hours with U.V. radiation (mercury vapor lamp, low pressure, 10 watts, wavelength 254 nm). After removal of the non-grafted polymer by washing with toluene, a degree of grafting in the vicinity of 30% is found.

To establish the valuable properties of the purification agents according to the invention, a certain number of experiments were carried out which will be described in the following examples.

EXAMPLE A

Removal of large amounts of hydrocarbons

Into a beaker of 1 l capacity, 600 ml of water and 40 ml of benzene are introduced.

The supernatant layer of benzene is dredged with 18 g of a purification agent constituted by a silica support of the "AEROSIL 130" type on which there has been fixed to a degree of 30% butadiene-styrene copolymer. An immediate swelling of the purification agent is observed accompanied by the disppearance of the benzene.

The product formed may be very easily recovered for example with a skimmer.

The benzene absorbed by the polymer may be removed by drying in an oven at 80° C or again recovered by distillation, for example, under reduced pressure.

A blank test with pulverulent silica alone does not enable the benzene layer to be removed.

EXAMPLE B

Removal of large amounts of hydrocarbons

Operation is effected with the same amount of water and of benzene as in the Example A. By means of a turbo-stirrer, the benzene is dispersed in the aqueous medium. There is added the same amount of the same purification agent as in the Example A. The benzene is removed gradually. A time of contact of about 10 minutes is necessary.

EXAMPLE C

Removal of petroleum and of fuel oil

Into two beakers of 1 l capacity, are added 600 ml of water and, respectively, 100 ml of petroleum and 100 ml of household fuel oil with stirring. There is then added respectively 10 g of purification agent formed from butadiene-styrene rubber on silica.

The agent swelled rapidly by absorbing the petroleum and the fuel oil. At the end of 60 seconds, the purification agent swollen with petroleum or fuel oil may be removed by sieving. The purification agent can be regenerated by drying in vacuo.

EXAMPLE D

Removal of bitumen

A benzene solution containing about 2% of industrial bitumen is prepared.

This solution is mixed with 5 times the volume of water. After manual stirring, a sample of 1 ml is treated with 300 mg of purification agent according to Example A. An immediate "take-up" of bitumen from the solution is observed. The agglomerates formed are easily removable with a skimmer. It is observed moreover that the product obtained is not dirty.

The residual water is perfectly clear.

EXAMPLE E

Removal of heavy fuel

Two specimens of 5 ml of heavy fuel, very viscous, are dispersed by a turbo-stirrer in respectively 2000 ml of ordinary water and 2000 ml of salt water (5 g NaCl/liter).

The gradual addition of 1 g of the agent according to Example A enables decontamination of the water. The absorbant power is situated at about 1 ml of fuel per 100 mg of agent according to the Example A. It is however necessary to employ about half the weight of purification agent with respect to the weight of fuel to fully purify the water within a reasonable time, that is to say of the order of 5 minutes.

By operating in a test tube, it is observed that the fuel, which normally remains attached to the walls of the glass tube, passes entirely onto the grafted powder. The utilization of these products for the cleansing of tanks containing heavy fuel can hence be envisaged.

EXAMPLE F

Collection of carbon black or of soot

A quantity of 0.1 g of acetylene black of extremely small particle size of the order of 150 A diameter, is dispersed in 20 ml of water. At the end of some hours of stirring, the black is "wetted" by the water and decanted. At the beginning of the experiment, due to the fact of the presence at the surface of aromatic oils arising in the manufacture, the black is rather hydrophobic.

It can be collected in an organic phase, for example benzene, but remains difficult to recover.

By adding 1 g of the purification agent according to Example A, slightly swollen by the addition of some drops of benzene, the black agglomerates around the particles of the agent and can easily be removed from the aqueous medium.

EXAMPLE G

The purification agent constituted of butyl rubber grafted on silica is obtained according to Example 10, and is used for the purification of water charged with hydrocarbons. It is capable of absorbing 1 to 2 times its weight of hydrocarbons.

This being the case, it is indicated that the purification agents according to the invention, when the grafted polymer contacts unsaturations, must be kept protected from air.

As a result of which and whatever the embodiment adopted, there is thus provided an agent and a method of purification of the type concerned, whose characteristics and advantages emerge sufficiently from the foregoing for it to be unnecessary to dwell further on this subject and which can be applied in the field of removal of hydrocarbons polluting waters and in the field of cleaning tanks which have contained heavy fuel, for example in the "degassing" of petroleum tanks.

As is self-evident and as emerges already from the foregoing, the invention is in no way limited to those of its types of application, nor to those embodiments of its various parts which have been more especially indicated; it encompasses, on the contrary, all modifications.

We claim:

1. A method for the removal of hydrocarbons from water polluted with same comprising contacting said polluted water with an effective amount of a purification agent comprising particles of a pulverulent mineral solid selected from the group consisting of silica, silicates, silicoaluminates, metallic carbonates and oxides of zinc, titanium and aluminum, the surface of said particles having fixed thereon chains of polymer selected from the group consisting of macro-molecular paraffins and their derivatives, polyvinyl derivatives, polydienes, polyolefins and polystyrenes, said chains of polymer being fixed to the surface of said particles by graft reaction of said polymer with the surface of said particles, whereby the hydrocarbon is absorbed by the polymer, the purification agent being then recovered.

2. The method of claim 1 wherein the mineral solid is silica.

3. The method of claim 1 wherein the polymer is a polyolefin.

4. The method of claim 3 wherein the polyolefin is polyethylene.

5. The method of claim 1 wherein the polymer is a polydiene.

6. The method of claim 5 wherein the polydiene is selected from the group consisting of polyisoprene and copolymers of butadiene and styrene.

7. The method of claim 1 wherein the polymer comprises 3 to 90% by weight of the mineral solid particles.

* * * * *